N. FRANZEN.
METHOD OF AND APPARATUS FOR MANUFACTURING WIRE GLASS.
APPLICATION FILED MAY 18, 1908.

945,315.

Patented Jan. 4, 1910.

WITNESSES:
J. Herbert Bradley.
Charles Barnett.

INVENTOR
Nicklas Franzen,
by Christy and Christy
Atty's

UNITED STATES PATENT OFFICE.

NICKLAS FRANZEN, OF WALTON, PENNSYLVANIA.

METHOD OF AND APPARATUS FOR MANUFACTURING WIRE-GLASS.

945,315.     Specification of Letters Patent.     Patented Jan. 4, 1910.

Application filed May 18, 1908. Serial No. 433,457.

*To all whom it may concern:*

Be it known that I, NICKLAS FRANZEN, residing at Walton, in the county of Allegheny and State of Pennsylvania, a citizen of the United States, have invented or discovered certain new and useful Improvements in Methods of and Apparatus for Manufacturing Wire-Glass, of which improvements the following is a specification.

Figure 1:
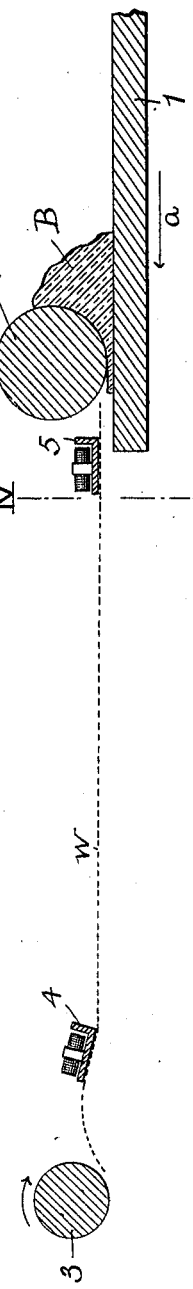
Figure 2:
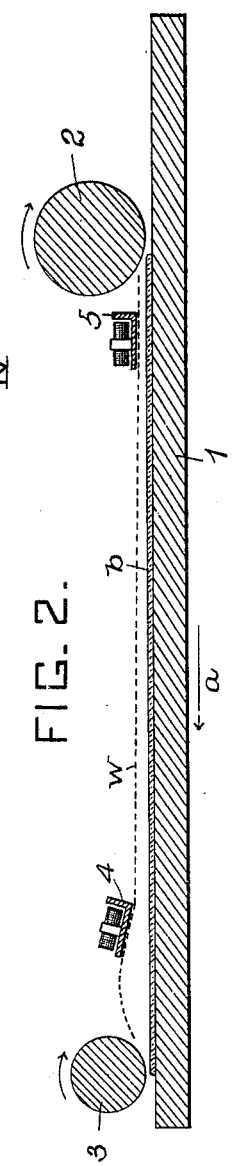
Figure 3:
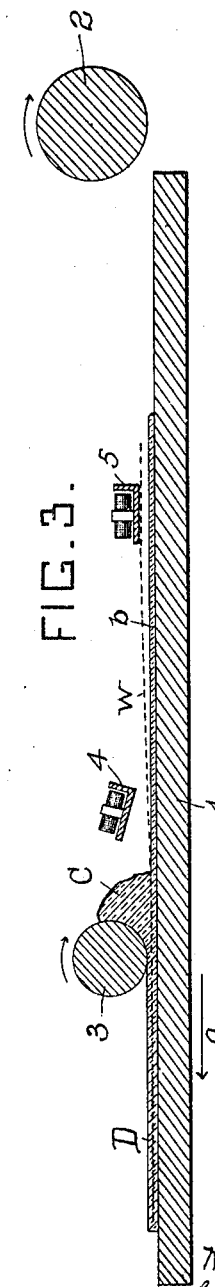
Figure 4:
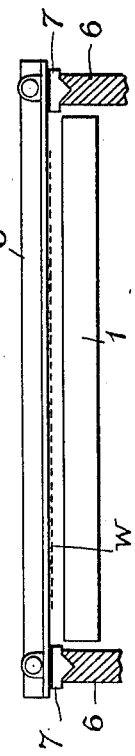

Referring to the drawings, Figures 1, 2 and 3 illustrate diagrammatically and in longitudinal section a machine which illustrates and embodies my present invention in three successive operative positions, and Fig. 4 is a view of the machine in transverse section on the line IV—IV of Fig. 1.

Parts which appear in the several figures bear the same reference characters in each case.

Referring to Fig. 1 my machine will be seen to consist essentially of a table 1, and two rolls for spreading the glass, 2 and 3, and of two supports for the wire 4 and 5. The sheet of glass is spread by the rollers which in the operation of the machine have a relative movement with respect to the table. In the instance I have chosen for illustration, the table 1 is movable and moves in the direction of the arrow $a$. In its movement it progresses beneath the rolls 2 and 3. The rolls 2 and 3 for spreading the glass are arranged transversely with respect to the table and are preferably spaced apart a distance equal to or greater than the length of the sheet which is to be formed. Roll 2 is so arranged that, as the table progresses beneath it, an initial layer teemed upon the table will be spread by roll 2 to layer form, and roll 3 is so arranged with respect to the path of movement of the table, that as the table continuing its traverse, passes beneath roll 3 a second batch of glass dumped upon the forward end of the initial layer will be spread by the roll 3 to a second layer upon the first, forming the completed sheet. The supports for the wire are arranged between the rolls 2 and 3. Their purpose is to so hold and support the wire that it shall be inserted between the layers while the upper layer is in course of formation; and that it shall be positively held adjacent to the surface of the initial layer, that it shall enter the sheet with precision and accuracy. To accomplish these ends I preferably form the supports in the manner shown, consisting of two magnetized bars of iron, which extend transversely across the table separated from one another at a distance equal approximately to the length of the sheet to be formed, and accordingly approximately to the length of the piece of wire netting which is to be introduced. I find it convenient to form these two bars of pieces of angle-iron magnetized by electromagnets as indicated in the drawings. These supports 4 and 5 are so placed with respect to the table 1 that as the table 1 advances beneath them, bearing upon its upper surface the initial layer of glass, the initial layer may pass freely beneath. I preferably so adjust the supports that the layer of glass advancing beneath shall just clear the wire, and the wire shall be held above it, spaced a short distance therefrom.

The construction of the machine will be further apparent in the further description of its operation. Fig. 1 shows the machine when it is just starting to move. In this position the table 1 is at the extreme of its operation. Fig. 1 shows the machine. A web of wire W is held in position by the supports 4 and 5, and an initial layer of glass $b$ is being spread upon the table 1 beneath roll 2 from an original batch of molten glass B teemed in place upon the table top. Fig. 2 shows the machine in a subsequent position where the roll 2 has finished its office. The table has advanced until the initial layer $b$ lies upon the table between the rolls 2 and 3. In this position the wire W is held by the supports 4 and 5 adjacent to but above and free from contact with the upper surface of the layer $b$. When the table reaches this point the wire mesh W at the end adjacent to the roll 3 is freed from the support 4. This is accomplished in my preferred arrangement by merely deënergizing the magnet which is the effective part of support 4. The end of the wire W which up to that time has been supported by the support 4, will then rest freely upon the upper surface of the initial layer $b$; the second pour of glass C is then made upon the forward end of the initial layer b and upon the end of the wire W which lies upon that layer immediately adjacent to roll 3. Further traverse of the table in the same direction then causes roll 3 to spread the second batch of glass C to layer form upon the initial layer and the superposed wire to form the sheet of wire glass D.

It will be observed that, as the table progresses and parts are operating in the manner indicated in Fig. 3, the wire is progressively brought beneath the batch of glass C, where the second layer is spread over it, and it will further be observed that the traction of the table 1 holds the wire taut from the point where it is entrained to the support 5, and in consequence of this tension upon the wire, the expansion of the wire up to the time when it is embedded in the glass is taken up and the wire enters the hot glass in heated and expanded condition, so that it has less tendency after its incorporation in the glass to move and set up strains in the body of the sheet.

Fig. 4 illustrates a convenient arrangement by which the tension which I have described may be maintained. In this figure it will be seen that the support 5 is carried upon a stationary frame 6 and upon this stationary frame support 5 is free to move in response to movement of the table, being mounted on slides 7 carried in grooves in the frame 6. It will be manifest that in such a construction an insulation must be interposed between the support itself and the slides 7. Referring again to Fig. 3, it will be observed that as the table 1 progresses in the direction indicated by the arrow a, carrying the finished sheet from beneath the roll 3, the support 5 to which the free end of the wire is held is drawn toward roll 3, and its progress continues until the free end of the wire approaches the residue of the batch C, when the support is broken as by demagnetization, and the wire then passes beneath the roll 3. It is this traction of the support 5 along the frame which carries it, which is effected through the wire mesh W itself, that produces the tension which I find of value for the benefit which I have described.

One further detail remains to be noted, and that is that it may be convenient to arrange the support 4, that is the support which is adjacent to roll 3, in such manner that the end of the wire W which is adjacent to the roll 3 may be held somewhat elevated, and thus guard it against any accidental contact with the initial layer before the initial layer reaches the position where it is desired that the wire W comes in contact with it. To this end, the surface of the magnetized bar against which the wire mesh is held is inclined in the manner shown in the drawings, instead of being parallel with the surface of the table, and on account of this inclined position it holds the free end of the wire elevated.

My improvement in method will be clearly understood from the foregoing description.

I claim herein as my invention:

1. In a wire glass machine, the combination of a table, two rolls arranged above the table to spread thereon superposed layers of glass, means for holding a web of wire corresponding in length to the length of the finished sheet extended in horizontal position from end to end adjacent to the upper surface of the initial layer when newly formed and means for releasing one end of said web of wire while the other end thereof continues to be supported, substantially as described.

2. In a machine for making wire glass, the combination of a table, two rolls arranged above the table and spaced the one from the other by a distance equal to the length of the sheet of wire glass to be formed, supports for a wire netting arranged to hold a length of wire by its opposite ends adjacent to the surface of the initial layer while said initial layer is being formed and advancing beneath such web of wire, such means for holding the wire permitting the release of one end and the gradual entraining of the wire in the sheet of wire glass, and at the same time holding the web of wire taut while being entrained, substantially as described.

3. In a machine for making wire glass, the combination of a table, a pair of rolls and a pair of wire supports, the table being movable relative to the remaining parts, the said rolls being so arranged above the table as to spread successive superposed layers of glass upon the table top and spaced from one another a distance at least equal to the length of the sheet of wire glass to be produced, the said supports for the wire being arranged between and adjacent to the, several rollers, and so constructed that the wire may be released from the several supports, each independent of the other, substantially as described.

4. The method of making wire glass described herein which consists in supporting a length of wire netting in horizontal position from end to end in close proximity to the plane of formation of a layer of glass, spreading a batch of molten glass to layer form and advancing it as it is formed beneath said length of netting, thereby heating said length of netting to or approximately to the temperature of the glass, releasing one end of said length of netting, allowing it to fall and rest upon the surface of said layer, teeming a second batch of glass upon that portion of the initial layer to which the netting has been so applied and spreading such second batch of glass to layer form over the initial layer and netting, exerting a pull on the entire length of netting at the beginning of said second spreading operation to remove the slack due to expansion, and maintaining such tension during the spreading of such second layer.

In testimony whereof, I have hereunto set my hand.

NICKLAS FRANZEN.

Witnesses:
CHARLES BARNETT,
FRIEDA E. WOLFF.